(12) United States Patent
Kim

(10) Patent No.: US 8,441,597 B2
(45) Date of Patent: May 14, 2013

(54) LIQUID CRYSTAL DISPLAY DEVICE FOR PREVENTING LIGHT LEAKAGE

(75) Inventor: Yong-Sang Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 154 days.

(21) Appl. No.: 12/654,422

(22) Filed: Dec. 18, 2009

(65) Prior Publication Data

US 2010/0157199 A1    Jun. 24, 2010

(30) Foreign Application Priority Data

Dec. 19, 2008  (KR) ..................... 10-2008-0130691

(51) Int. Cl.
*G02F 1/1335*    (2006.01)
*G09F 13/04*    (2006.01)

(52) U.S. Cl.
USPC ................. 349/64; 349/61; 349/62; 349/65; 362/97.1; 362/97.2

(58) Field of Classification Search ............... 349/64, 349/61, 65, 62; 362/97.1, 97.2
See application file for complete search history.

(56) References Cited

U.S. PATENT DOCUMENTS

| 2007/0008457 A1* | 1/2007 | Takahashi et al. ............ 349/64 |
| 2008/0043171 A1* | 2/2008 | Takahashi et al. ............ 349/65 |

FOREIGN PATENT DOCUMENTS

| JP | 2006-066120 | * | 3/2006 |
| JP | 2006-066120 A | | 3/2006 |

* cited by examiner

*Primary Examiner* — Lauren Nguyen
(74) *Attorney, Agent, or Firm* — McKenna Long & Aldridge LLP

(57) ABSTRACT

In the present invention, a diffusing sheet for diffusing light outputted from a light guide plate is extended to a stepped upper surface of an LED substrate and disposed at a lateral surface of the light guide plate so that the diffusing sheet can completely cover the light guide plate, thereby preventing undiffused light from being supplied to an liquid crystal display device.

15 Claims, 3 Drawing Sheets

LIQUID CRYSTAL DISPLAY DEVICE FOR PREVENTING LIGHT LEAKAGE

CROSS-REFERENCE TO RELATED APPLICATIONS

Pursuant to 35 U.S.C. §119(a), this application claims the benefit of earlier filing date and right of priority to Korean Application No. 10-2008-0130691 filed on Dec. 19, 2008, the contents of which is incorporated by reference for all purposes as if fully set forth herein.

BACKGROUND OF THE INVENTION

1. Field of the Invention

The present invention relates to a liquid crystal display, and more particularly, to a liquid crystal display device for extending a diffusing sheet to diffuse light emitted from a light guide plate to an upper surface of an LED substrate. The diffusing sheet is disposed at a lateral side of the light guide plate to cover an overall upper surface of the light guide plate, thereby preventing image degradation by undiffused light.

2. Description of the Related Art

In recent years, with the development of various portable electronic devices such as mobile phones, PDAs, notebook computers, or the like, the requirement for flat panel display devices having characteristics such as light weight, thin profile, and small sizes that can be applied to those portable electronic devices has been gradually increased. For those flat panel display devices, liquid crystal displays (LCD), plasma display panels (PDP), field emission displays (FED), vacuum fluorescent displays (VFD), and the like have been actively developed, but at present liquid crystal display (LCD) devices are primarily used because of their mass production technology, effective driving method, and high-definition and large screen.

The liquid crystal display device, as a transmission-type display device, displays desired images on a screen thereof by controlling the optical transmission using birefringence of liquid crystal molecules. For this purpose, the liquid crystal display device is provided with a backlight unit, which is a light source to transmit through a liquid crystal layer. Typically, the backlight unit can be largely classified into two types.

One is a side-type backlight unit that is provided at a lateral side of the liquid crystal display panel to emit light into a liquid crystal layer, and the other is a direct-type backlight unit that emits light directly into a liquid crystal layer from a lower portion of the liquid crystal display panel.

The side-type backlight unit is provided at a lateral side of the liquid crystal display panel to emit light into a liquid crystal layer through a reflection plate and a light guide plate. Therefore, it is allowed to have a thin thickness, and primarily used in a notebook computer, or the like, for which display devices having a thin thickness are required. The side-type backlight unit has a disadvantage in the application to a large-sized liquid crystal display panel because a lamp for emitting light is located at a lateral side of the liquid crystal display panel, and also has a disadvantage in obtaining high luminance because light is provided through a light guide plate. Consequently, there has been a problem that it is not suitable for large-sized liquid crystal display panels for LCD TVs.

The direct-type backlight unit may be applicable to a large-sized liquid crystal display panel as well as allow the display panel to have a high luminance because light emitted from a lamp is directly provided to a liquid crystal layer and thus in recent years it has been primarily used in the production of liquid crystal display panels for LCD TVs.

On the other hand, in recent years spontaneously emitting light sources such as a light emitting diode instead of a fluorescent lamp have been used for source of the backlight unit. This light source emits RGB monochromatic light and thus it has an advantage of having a wider color reproduction range and reduced driving power consumption when applied to a backlight unit.

FIG. 1 is a cross-sectional view schematically illustrating a structure of a liquid crystal display device in the related art in which a backlight unit having the foregoing light emitting element is provided.

As illustrated in FIG. 1, a liquid crystal display device includes a liquid crystal display panel 10 having a first substrate 1 and a second substrate 3, and a liquid crystal layer (not shown) for displaying an image by applying signals from the outside, an LED unit 52 having light emitting diodes (LEDs) disposed at a lower lateral side of the liquid crystal display panel 10 for emitting light, a light guide plate 20 disposed at a lower portion of the liquid crystal display panel 10 for guiding light emitted from the LED unit 52 to the liquid crystal display panel 10, a diffusing sheet 32 provided between the liquid crystal display panel 10 and the light guide plate 20 for diffusing light guided from the light guide plate 20 to the liquid crystal display panel 10, a prism sheet 34 positioned at an upper portion of the diffusing sheet 32 for condensing the diffused light, a main supporting unit 25 disposed at a low portion of the light guide plate 20 for supporting the light guide plate 20 and the liquid crystal display panel 10, and a lower cover 40 positioned at a lower portion of the main supporting unit 25 for assembling the liquid crystal display panel 10, the light guide plate 20, the diffusing sheet 32, the prism sheet 34, and the main supporting unit 25.

Furthermore, an LED substrate 50 mounted with the LED unit 52 is placed on an upper portion of the light guide plate 20 and the main supporting unit 25, and a reflection plate 28 is formed at the lower cover 40 to reflect light entered into the lower cover 40 to the liquid crystal display panel 10, thereby enhancing the efficiency of light emission.

Though not shown in the drawing, a plurality of pixels are provided in the first substrate 1 of the liquid crystal display panel 10 in which a pixel electrode and a thin-film transistor are formed at each of the pixels, and a common electrode is formed on the second substrate 3, and thus it is possible to display an image by controlling an amount of light transmission traveling the liquid crystal layer by a control of the alignment of liquid crystal molecules when applying a signal through the thin-film transistor from the outside. At this time, polarizing plates (not shown) are attached to the first and second substrates 1, 3, respectively, thereby controlling the polarization direction of light entered into the liquid crystal layer and also light outputted from the liquid crystal layer.

However, a liquid crystal display device having the foregoing configuration has a problem as follows.

Typically, when various elements such as a light guide plate 20, an LED unit 52, a liquid crystal display panel 10, and the like are assembled together by engaging with the main supporting unit 25, each of the elements should be assembled by taking the assembly tolerance into consideration. Accordingly, in case when a liquid crystal display device is assembled by taking the assembly tolerance into consideration, the gap 36 having a width of "x" may be created between the LED substrate 50 and the diffusing sheet 32 as illustrated in FIG. 2, and thus a lower portion of the light guide plate 20 is directly exposed to the diffusing sheet 32 and the prism sheet 34 while not being covered. Light emitted from the LED unit 52 and entered into the light guide plate 20 will be guided by the light guide plate 20, and diffused and condensed through the diffusing sheet 32 and the prism sheet 34, and applied to the liquid crystal display panel 10 in a uniform state. However, as described above, in case of when light outputted from the light guide plate 20 through the gap 36 between the LED substrate 50 and the diffusing sheet 32 is outputted without passing through the diffusing sheet 32 and the prism sheet 34, the undiffused light of the LED unit 52 will be directly supplied to the liquid crystal display panel 10, thereby causing a problem of degrading image quality in the region supplied by the relevant light, because a different type of light will be supplied, which is not diffused and condensed by the diffusing sheet 32 and the prism sheet 34.

SUMMARY OF THE INVENTION

The present invention is contrived to solve the aforementioned problem and an object of the invention is to provide a liquid crystal display device capable of diffusing the light emitted from an LED unit and outputted through an edge region of a light guide plate, by extending a diffusing sheet placed on the light guide plate to completely cover the light guide plate.

In order to accomplish the foregoing object, a liquid crystal display device according to the present invention includes a liquid crystal display panel; a light emitting device (LED) unit having a plurality of light emitting devices provided at a lower lateral side of the liquid crystal display panel for supplying light to the liquid crystal display panel; a light guide plate disposed at a lower portion of the liquid crystal display panel for guiding light emitted from the LED unit to the liquid crystal display panel; an LED substrate mounted with the LED unit and a part of the LED substrate being positioned on an outer peripheral region of the light guide plate; and at least one diffusing sheet disposed in an upper portion of the light guide plate for diffusing light from the light guide plate, wherein a step is formed at the LED substrate so that the diffusing sheet is extended to the stepped region of the LED substrate to cover completely an upper surface of the light guide plate diffusing sheet.

The liquid crystal display device is formed with an accommodation space positioned at an upper portion of the LED substrate for accommodating the diffusing sheet between a lower surface of the liquid crystal display panel and a stepped upper surface of the LED substrate, and the diffusing sheet is bent up to a stepped upper surface of the light guide plate.

According to the present invention, a diffusing sheet is positioned at a step of the LED substrate by increasing the area of a diffusing sheet than that of a light guide plate and forming a step on the LED substrate, thereby allowing the diffusing sheet to completely cover an upper surface of the light guide plate. As a result, the whole light emitted from the LED unit and supplied to the liquid crystal display panel is diffused, thereby preventing image degradation due to the supply of undiffused light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a liquid crystal display device according to a preferred embodiment of the present invention will be described in detail with reference to the accompanying drawings.

Figure 1:
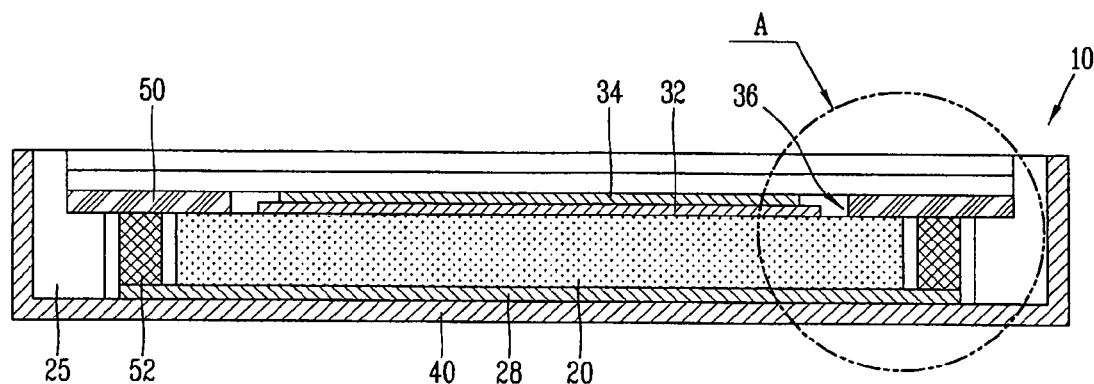
FIG. 1 is a cross-sectional view illustrating a structure of a liquid crystal display device in the related art.
Figure 2:
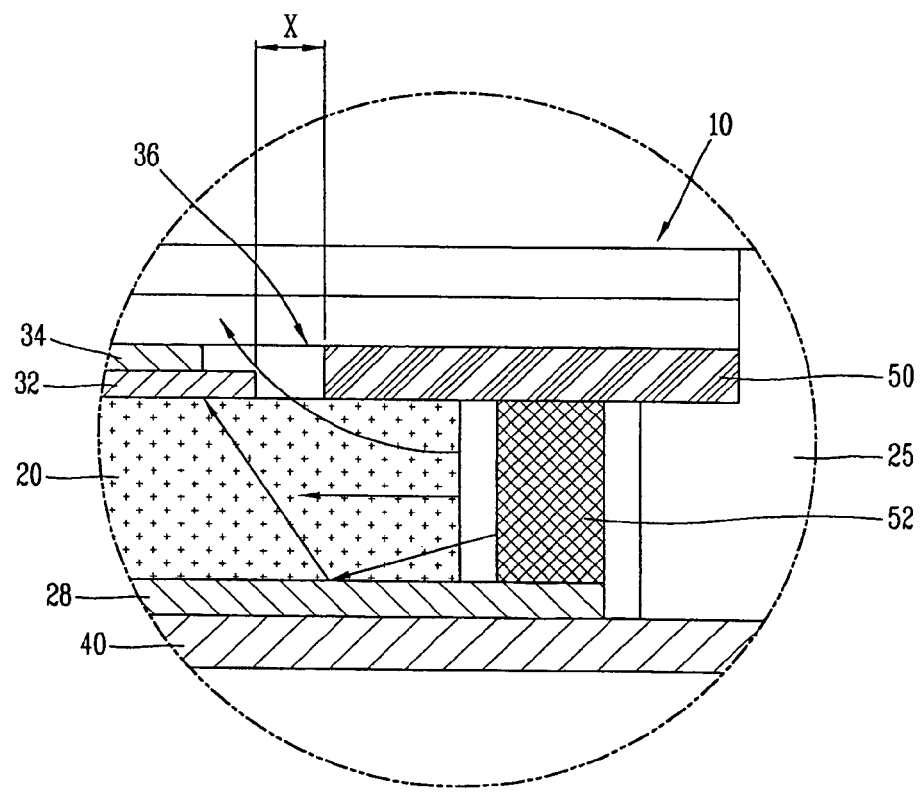
FIG. 2 is an enlarged view illustrating the "A" region of FIG. 1.
Figure 3:
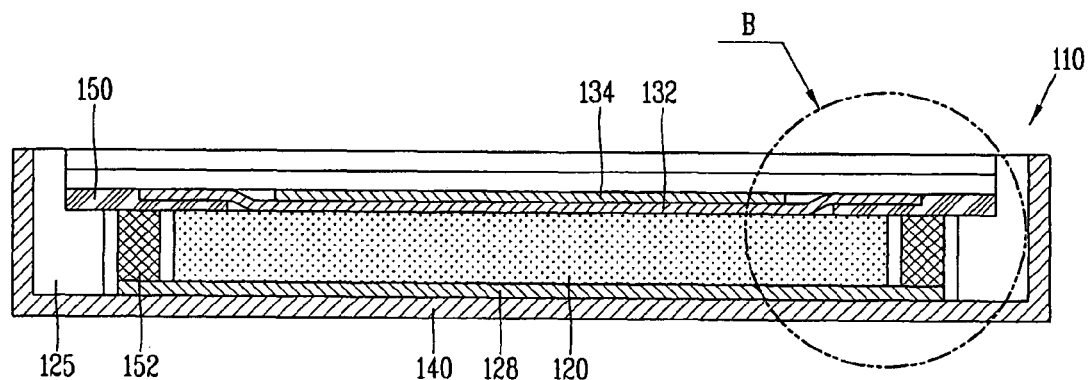
FIG. 3 is a cross-sectional view illustrating a structure of a liquid crystal display device according to the present invention.

FIG. 3 is a cross-sectional view illustrating a structure of a liquid crystal display device according to the present invention.

As illustrated in FIG. 3, a liquid crystal display device largely includes a liquid crystal display panel 110 and a backlight unit for supplying light to the liquid crystal display panel 110.

The liquid crystal display panel 110 includes a first substrate 101 and a second substrate 103 made of a transparent material such as glass, and a liquid crystal layer (not shown) disposed between the first substrate 101 and the second substrate 103.

The backlight unit includes an LED unit 152 having a plurality of LEDs disposed at one or both sides of a lower portion of the liquid crystal display panel 110 for emitting light, a light guide plate 120 disposed at a lower portion of the liquid crystal display panel 110 for guiding the light emitted from the LED unit 152 disposed at one or both sides thereof to the liquid crystal display panel 110, a diffusing sheet 132 disposed between the liquid crystal display panel 110 and the light guide plate 120 for diffusing the light guided from the light guide plate 120 to the liquid crystal display panel 110, a prism sheet 134 for condensing the light diffused by the diffusing sheet 132 and providing uniform light to the liquid crystal display panel 110.

Figure 5:
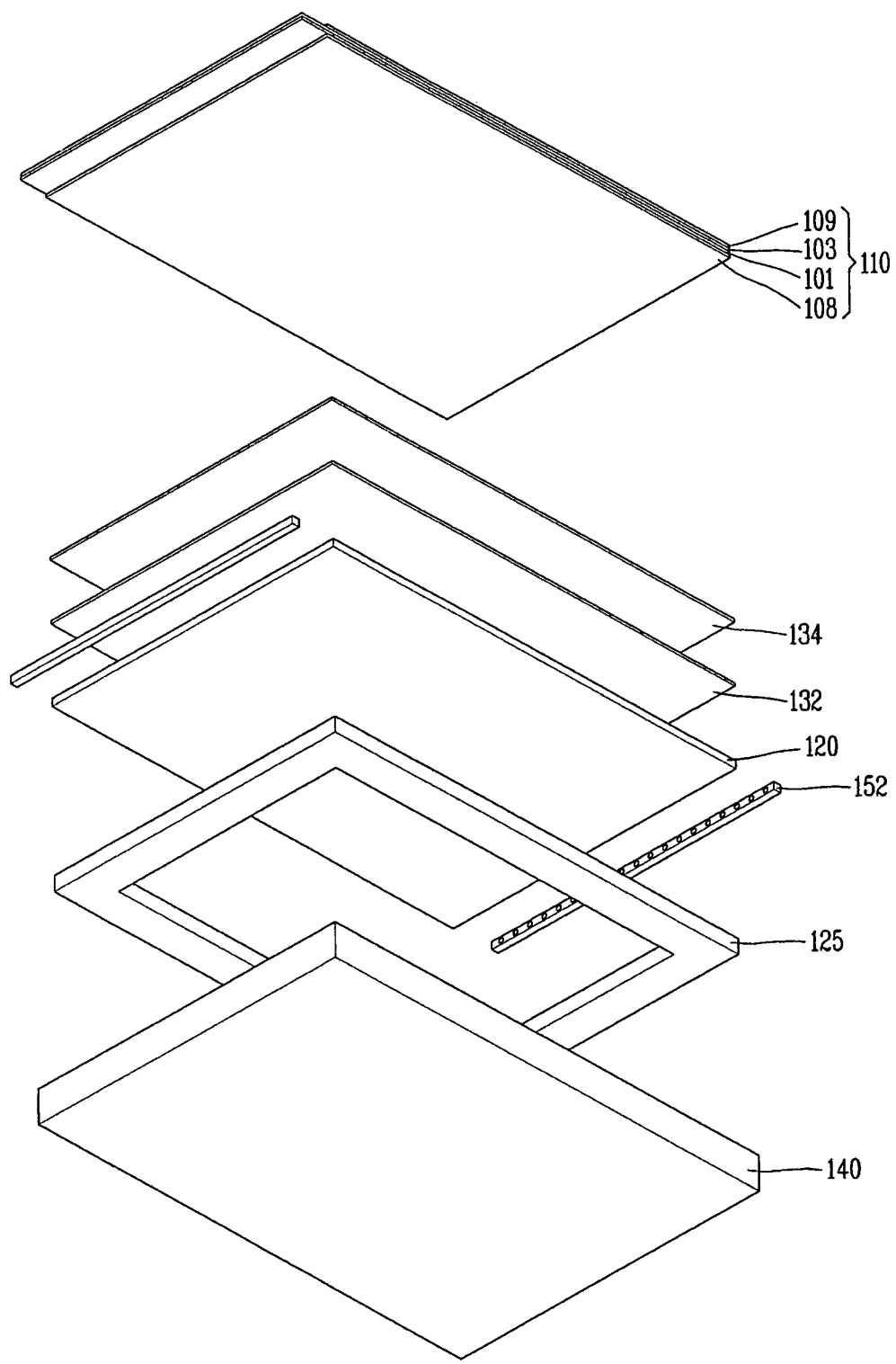
FIG. 5 is a perspective view illustrating a liquid crystal display panel structure of a liquid crystal display device according to the present invention.

FIG. 5 is a view illustrating a liquid crystal display panel structure of a liquid crystal display device according to the present invention. As illustrated in FIG. 5, the liquid crystal display device includes a first substrate 101 that is a thin-film transistor array substrate and a second substrate 103 that is a color filter substrate and a liquid crystal layer 112 formed between the first substrate 101 and the second substrate 103.

The first substrate 101 includes a plurality of gate lines 102 and data lines 104 arranged vertically and horizontally with each other for defining a plurality of pixel regions (P), thin-film transistors (T) that are switching elements each being formed at a crossed region of the gate line 102 and the data line 104, and a plurality of pixel electrodes 105 formed on the pixel regions (P).

Though not shown in the drawing, the thin-film transistor (T) includes a gate electrode connected to the gate line 102, a semiconductor layer formed by laminating amorphous silicon on the gate electrode, and a source electrode and a drain electrode formed on the semiconductor layer and connected to the data line 104 and the pixel electrode 105.

Furthermore, the second substrate 103 includes a color filter (C) configured with a plurality of sub-color filters 107 for displaying red (R), green (G), and blue (B) colors, a black matrix 106 for dividing each of the sub-color filters 107 and blocking light traveling through the liquid crystal display panel 112, and a transparent common electrode 118 for applying a voltage to the liquid crystal display panel 112.

The first substrate 101 and the second substrate 103, as described above, are adhered by facing each other by a sealant (not shown) formed at an outside of the image display region to constitute a liquid crystal display panel, and the adhesion between the first substrate 101 and the second substrate 103 is achieved by an alignment key (not shown) formed on the first substrate 101 or second substrate 103.

The LED unit 152 includes RGB LED elements for emitting red (R), green (G), and blue (B) monochrome lights or an LED element for emitting white light. In case of an arrangement of the LED element for emitting monochrome light, RGB monochrome LED elements are arranged with a predetermined distance to mix monochrome lights emitted from the LED elements into white light, and then supply the mixed white light to the liquid crystal display panel 110. In case of an arrangement of the LED element for emitting white light, a plurality of LED elements are arranged with a predetermined distance to supply white light to the liquid crystal display panel 110.

Here, the white LED element is configured with a blue LED for emitting blue color and a fluorescent substance for absorbing blue monochrome light to emit yellow light, and therefore, blue monochrome light outputted from the blue LED is mixed with yellow monochrome light emitted from the fluorescent substance to supply white light to the liquid crystal display panel 110.

The LED unit 152 is mounted on an LED substrate 150. The LED substrate 150 is made of a non-transparent printed circuit board or flexible circuit board, and the LED unit 152 is mounted thereon, and furthermore, signal wiring lines are formed at an upper or lower surface thereof and electrically connected to lead lines of the LED unit 152. In addition, an inverter for applying power to the LED unit 152, a connector for connecting the inverter to the LED unit 152, and an LED controller may be mounted on the LED substrate 150. Here, the inverter for applying power to the LED unit 152, the connector for connecting the inverter to the LED unit 152, and the LED controller are connected to the LED unit 152 through signal wiring lines that are formed on the LED substrate 150.

As illustrated in FIG. 3, in the present invention, a step is formed at an upper surface of the LED substrate 150. In other words, a step is formed at an upper surface thereof by forming a thickness of the region adjacent to the light guide plate 120 smaller than that of the region not adjacent to the light guide plate 120 whereas a lower surface of the LED substrate 150 is made flat.

The light guide plate 120 is provided to guide light entered from the LED unit 152 to the liquid crystal display panel 110, wherein light entered to a lateral side of the light guide plate 120 is reflected on the upper and lower surfaces of the light guide plate 120 and propagated to the other lateral side, and then outputted to an outside of the light guide plate 120. At this time, the light guide plate 120 is made of a rectangular parallelepiped and the lower surface thereof may be formed with a pattern, grooves, or the like to diffuse incident light, and a lower portion of the light guide plate 120 is provided with a reflection plate 40 to reflect incident light that has not been reflected from the lower surface of the light guide plate 120 (an angle entered to the lower surface thereof at equal to or greater than critical angle).

The diffusing sheet 132 for diffusing light outputted from the light guide plate 120 in order to provide constant luminance is fabricated by distributing spherical seeds made of acrylic resin on a base film primarily made of polyester (PET). The light outputted from the light guide plate 120 is diffused on the spherical seeds to equalize the luminance of the outputted light. In the drawing, the diffusing sheet 132 is provided with one sheet, but a plurality of sheets (more than two) may be used based on a size of the liquid crystal display device, a kind of the backlight unit, and other variables.

The prism sheet 134 is provided on an upper portion of the diffusing sheet 132 to condense the light diffused from the diffusing sheet 132, and it is fabricated by forming a regular prism made of acrylic resin on a base film primarily made of polyester (PET).

As illustrated in FIG. 3, the liquid crystal display panel 110, the light guide plate 120, the LED unit 152, the diffusing sheet 132, and the prism sheet 134 are supported by a main supporting unit 125 and then assembled by a lower cover 140. At this time, the LED substrate 150 is contacted and supported by the main supporting unit 125 and the light guide plate 120, and the LED unit 152 that is mounted on the LED substrate 150 is disposed between the main supporting unit 125 and the light guide plate 120.

Furthermore, the diffusing sheet 132 and the prism sheet 134 are placed on the light guide plate 120, and an outer peripheral region of the liquid crystal display panel 110 is supported by the LED substrate 150. Though not shown in the drawing, the main supporting unit 125 is provided with a separate supporting region of the liquid crystal display panel 110 to support the liquid crystal display panel 110.

Though not shown in the drawing, a liquid crystal display device assembled by the lower cover 140 as described above may be provided with an upper cover to engage with the lower cover 140.

In the present invention, a step is created on an upper surface of the LED substrate 150, and thus made of a first surface having a low thickness and a second surface having a high thickness. Furthermore, the diffusing sheet 132 placed on an upper surface of the light guide plate 120 is extended to a side of the LED substrate 150, and part of the diffusing sheet 132 is made contact with the first upper surface of the LED substrate 150. The liquid crystal display panel 110 is placed on the second surface of the LED substrate 150. As the liquid crystal display panel 110 is place on the second surface of the LED substrate 150, a space is formed between the second substrate 103 of the liquid crystal display panel 110 and the second surface of the LED substrate 150, and an extended part of the diffusing sheet 132 is accommodated into the space.

Figure 4:
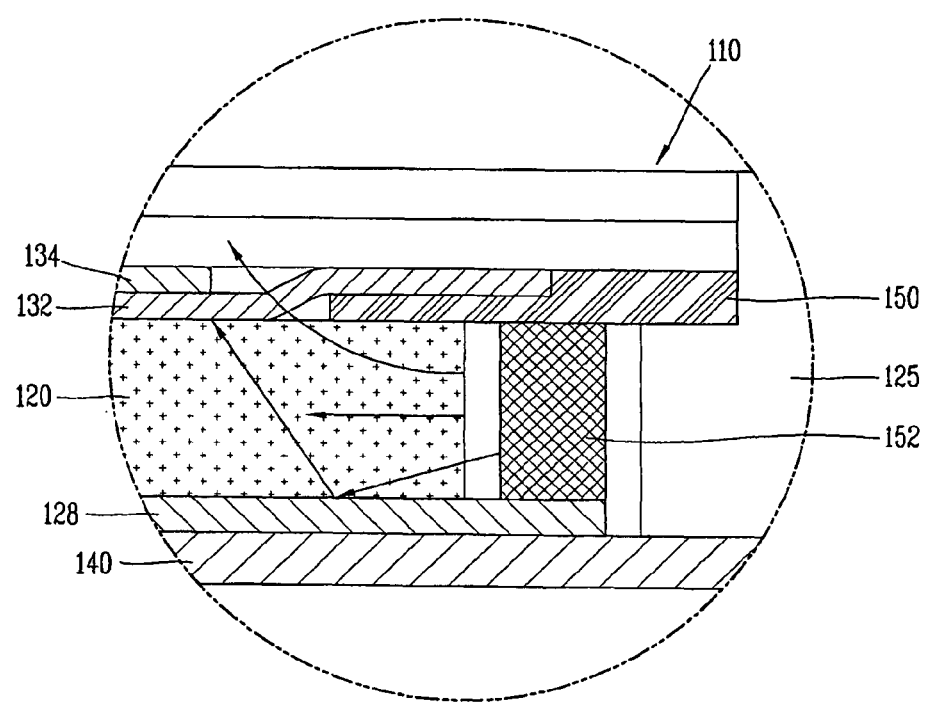
FIG. 4 is an enlarged view illustrating the "B" region of FIG. 3.

FIG. 4 is an enlarged view illustrating the "B" region of FIG. 3. As illustrated in FIG. 4, an outer peripheral region of the diffusing sheet 132 positioned at an upper surface of the light guide plate 120 is bent up to a stepped first surface of the LED substrate 150 so as to locate into an accommodation space formed between the liquid crystal display panel 110 the LED substrate 150, and thus an overall upper surface of the light guide plate 120 is covered by the diffusing sheet 132. In the related art, a predetermined gap may be created between the diffusing sheet 132 and the LED substrate 150 since the liquid crystal display device is assembled by taking the assembly toleration into consideration, thereby allowing the relevant region of the light guide plate 120 to be exposed to the outside thereof. In the present invention, however, the diffusing sheet 132 is bent up to an upper surface of the LED substrate 150 covering an edge region of the light guide plate 120, and thus a gap is not created between the diffusing sheet 132 and the LED substrate 150, and as a result, the diffusing sheet 132 can cover an overall area of the light guide plate 120.

Though a configuration in which the diffusing sheet 132 is only bent up to an upper surface of the light guide plate 120 is disclosed in the drawing, the prism sheet 134 as well as the diffusing sheet 132 may be also bent up to an upper surface of the light guide plate 120 to cover an overall upper surface of the light guide plate 120 by both the diffusing sheet 132 and the prism sheet 134.

Furthermore, the diffusing sheet 132 may be provided with a plurality of sheets to effectively diffuse incident light, and also in this case, a plurality of diffusing sheets 132 may be all accommodated into an accommodation space disposed at an upper surface of the light guide plate 120, or one or some of the plurality of diffusing sheets 132 may be only accommodated into an accommodation space disposed at an upper surface of the light guide plate 120.

On the other hand, an extended region of the diffusing sheet 132 may be also positioned at another place other than a stepped upper surface of the LED substrate 150. According to the present invention, a step is made on an upper surface of the LED substrate 150 to provide an accommodation space for accommodating an extended region of the diffusing sheet 132 between the LED substrate 150 and the liquid crystal display panel 110 disposed thereon, i.e., an outer peripheral region of the diffusing sheet 132, into an upper surface of the LED substrate 150. For this purpose, any shape of the LED substrate 150 may be allowed if there is formed an accommodation space for accommodating an outer peripheral region of the diffusing sheet 132 into an upper surface of the LED substrate 150. In addition, other configurations of the LED substrate 150 may be also formed, for example, an accommodation space for accommodating an extended region of the diffusing sheet 132 into the liquid crystal display panel, or the like.

In the liquid crystal display device having the foregoing configuration, when monochrome or white light is emitted from the LED elements of the LED unit 152 that are disposed at both lateral sides of the light guide plate 120, the emitted light is entered into the light guide plate 120 through both lateral sides of the light guide plate 120. The incident light entered into the light guide plate 120 is reflected on a lower or upper surface of the light guide plate 120 and moved to the other surface if entered into the lower or upper surface of the light guide plate 120 at an angle less than critical value, and the incident light entered into the lower surface thereof at an angle equal to or greater than critical value is entered into the light guide plate 120 by the reflection plate 128. The incident light entered into the upper surface of the light guide plate 120 at an angle equal to or greater than critical value is outputted from the light guide plate 120 and diffused in the diffusing sheet 132 and condensed in the prism sheet 134, and then supplied to the liquid crystal display panel 110.

At this time, in the present invention, an overall upper surface region of the light guide plate 120 is covered by the diffusing sheet 132 because an edge region of the diffusing sheet 132 is bent up to an upper surface of the LED substrate 150 adjacent to the light guide plate 120. As a result, the light outputted to an edge region of the light guide plate 120 is also entered into the diffusing sheet 132, and thus the light outputted from the overall light guide plate 120 is diffused by the diffusing sheet 132, and then supplied to the liquid crystal display panel 110.

In other words, the diffusing sheet 132 covers the overall light guide plate 120 in the present invention whereas undiffused light is leaked into an outer peripheral region of the light guide plate 120, i.e., a space between the diffusing sheet and the LED substrate and supplied to the liquid crystal display panel in the related art, and consequently, the light outputted from an outer peripheral region of the light guide plate 120 is also diffused by the diffusing sheet 132, and then supplied to the liquid crystal display panel 110.

As described above, the present invention is characterized in that the diffusing sheet 132 completely covers an upper surface of the light guide plate 120 by extending the diffusing sheet 132 to an upper surface of the LED substrate 150 disposed at a lateral upper surface of the light guide plate 120, thereby preventing light outputted from the light guide plate 120 from being supplied to the liquid crystal display panel 110 in an undiffused state by the diffusing sheet 132.

From such a point of view, according to the present invention, any configuration can be made if the diffusing sheet 132 is formed with a larger size than that of an upper surface of the light guide plate 120 to cover up to an edge region of the light guide plate 120. Furthermore, the present invention is not only limited to a backlight unit and a liquid crystal display device having LEDs. It may be also applicable to a light source having a florescent lamp such as cold cathode fluorescent lamp (CCFL). In case of the backlight unit using a fluorescent lamp as the light source thereof, taking the assembly tolerance of a lamp housing for accommodating the fluorescent lamp, the light guide plate 120, the diffusing sheet 132, and the like into consideration, part of the diffusing sheet 132 may be assembled with the lamp housing by a predetermined gap, and an outer peripheral upper surface of the light guide plate 120 may be directly exposed to the outside without being covered by the diffusing sheet 132. Even in case of a structure having the fluorescent lamp and lamp housing, an accommodation space for accommodating the diffusing sheet 132 may be formed by changing the structure of the lamp housing to cover an overall upper surface of the light guide plate 120 if the area of the diffusing sheet 132 is increased larger than that of the light guide plate 120.

Accordingly, in a liquid crystal display device according to the present invention, a diffusing sheet may be configured to cover an overall upper surface of a light guide plate in various ways based on a structure of the liquid crystal display device, and such various configurations fall within the scope of the present invention. In other words, other examples or embodiments of a liquid crystal display device using the basic concept of the present invention can be easily contrived by those skilled in the art.

What is claimed is:

1. A liquid crystal display device, comprising:
   a liquid crystal display panel;
   a light emitting device (LED) unit having a plurality of light emitting devices provided at a lower lateral side of the liquid crystal display panel for supplying light to the liquid crystal display panel;
   a light guide plate disposed at a lower portion of the liquid crystal display panel for guiding light emitted from the LED unit to the liquid crystal display panel;
   an LED substrate mounted with the LED unit and a part of the LED substrate being positioned on an outer peripheral region of the light guide plate, the LED substrate including a first portion and a second portion having a thickness smaller than that of the first portion so that the surface of the LED substrate is stepped; and
   at least one diffusing sheet disposed in an upper portion of the light guide plate for diffusing light from the light guide plate,
   wherein the diffusing sheet is extended to the stepped region of the LED substrate so that the a part of the diffusing sheet is disposed at the second portion of the LED substrate to cover completely an upper surface of the light guide plate.

2. The liquid crystal display device of claim 1, wherein the liquid crystal display panel is disposed in the upper portion of the LED substrate so that an accommodation space between a lower surface of the liquid crystal display panel and a surface of the second portion of the LED substrate is formed to accommodate the diffusing sheet.

3. The liquid crystal display device of claim 1, wherein the diffusing sheet is bent up to the second portion of the LED substrate.

4. The liquid crystal display device of claim 1, further comprising:
a prism sheet above the diffusing sheet for condensing the diffused light and supplying the condensed light to the liquid crystal display panel.

5. The liquid crystal display device of claim 4, wherein the prism sheet is extended to the step region of the LED substrate so that the prism sheet is disposed at the second portion of the LED substrate to completely cover the upper surface of the light guide plate.

6. The liquid crystal display device of claim 1, further comprising:
a lower cover for receiving the liquid crystal display panel, the light guide plate, the diffusing sheet, and the LED substrate.

7. The liquid crystal display device of claim 1, wherein the LED substrate includes a printed circuit board and a flexible circuit board.

8. The liquid crystal display device of claim 1, wherein a plurality of diffusing sheets are disposed in the upper portion of the light guide plate.

9. The liquid crystal display device of claim 8, wherein one diffusing sheet of a plurality of diffusing sheets is disposed at the second portion of the LED substrate.

10. The liquid crystal display device of claim 8, wherein a part of the diffusing sheets are disposed at the second portion of the LED substrate.

11. The liquid crystal display device of claim 8, wherein all of the diffusing sheets are disposed at the stepped second portion of the LED substrate.

12. A liquid crystal display device, comprising:
a liquid crystal display panel;
a light emitting device (LED) unit having a plurality of light emitting devices provided at a lower lateral side of the liquid crystal display panel for supplying light to the liquid crystal display panel;
a light guide plate disposed at a lower portion of the liquid crystal display panel for guiding light emitted from the LED unit to the liquid crystal display panel;
an LED substrate mounted with the LED unit and a part of the LED substrate being positioned on an outer peripheral region of the light guide plate;
at least one diffusing sheet disposed in an upper portion of the light guide plate for diffusing light from the light guide plate, a surface area of the diffusing sheet being larger than a surface area of the light guide plate parallel to the liquid crystal display panel so that the at least one diffusing sheet covers totally the light guide plate;
a prism sheet above the diffusing sheet for condensing a diffused light and supplying a condensed light to the liquid crystal display panel; and
a receiving portion for receiving a part of the diffusing sheet to cover completely an upper surface of the light guide plate,
wherein a surface of the at least one diffusing sheet facing the liquid crystal display panel which is received in the receiving portion is substantially coplanar with a surface of the prism sheet facing the liquid crystal display panel.

13. The liquid crystal display device of claim 12, wherein the receiving portion is formed in the LED substrate.

14. The liquid crystal display device of claim 12, wherein the receiving portion is a stepped region of the LED substrate.

15. The liquid crystal display device of claim 12, wherein the receiving portion is formed in the liquid crystal display panel.

* * * * *